United States Patent
Zmyewski (10) Patent No.: US 12,360,012 B2
(45) Date of Patent: Jul. 15, 2025

(54) BUMP STEER CALCULATOR

(71) Applicant: Justin Zmyewski, Houston, MN (US)

(72) Inventor: Justin Zmyewski, Houston, MN (US)

( * ) Notice: Subject to any disclaimer, the term of this patent is extended or adjusted under 35 U.S.C. 154(b) by 129 days.

(21) Appl. No.: 18/092,685

(22) Filed: Jan. 3, 2023

(65) Prior Publication Data
US 2023/0243720 A1    Aug. 3, 2023

Related U.S. Application Data

(63) Continuation of application No. 17/468,324, filed on Sep. 7, 2021, now Pat. No. 11,656,155.

(60) Provisional application No. 63/076,528, filed on Sep. 10, 2020.

(51) Int. Cl.
*G01M 17/04* (2006.01)
*B60G 17/016* (2006.01)

(52) U.S. Cl.
CPC ........... *G01M 17/04* (2013.01); *B60G 17/016* (2013.01); *B60G 2206/90* (2013.01)

(58) Field of Classification Search
CPC ........... G01M 17/04; B60G 2200/4622; B60G 2206/93; B60G 2200/462
USPC ........................................ 73/117.01–117.3
See application file for complete search history.

(56) References Cited

U.S. PATENT DOCUMENTS 3,793,734 A * 2/1974 Merrill ................ G01M 17/065
33/203.14

FOREIGN PATENT DOCUMENTS

CN         201540205 U      8/2010

OTHER PUBLICATIONS

Speedwaymotors, bump steer gauge instructions, 2015 (Year: 2015).*
DECO (DECO bump steer gauge, 2016, https://www.speedwaymotors.com/DECO-Bump-Steer-Gauge%2C2703.html) (Year: 2016).
Speedwaymotors (bump steer gauge instructions, 2015; https://static.speedwaymotors.com//pdf/910-82700.pdf) (Year: 2015).

* cited by examiner

*Primary Examiner* — Timothy P Graves
(74) *Attorney, Agent, or Firm* — Craig R. Miles; CR MILES P.C.

(57) ABSTRACT

A vehicle suspension bump steer measurement apparatus and method of measuring bump steer in a vehicle suspension for productive management of toe change throughout compression and rebound of a vehicle suspension.

14 Claims, 9 Drawing Sheets

BUMP STEER CALCULATOR

I. FIELD OF THE INVENTION

The present invention relates to a vehicle suspension bump steer measurement apparatus and method of measuring bump steer in a vehicle suspension for productive management of toe change throughout compression and rebound of the suspension system.

II. BACKGROUND OF THE INVENTION

Bump steer refers to the tendency of the wheel of a car to steer itself as it moves through the suspension stroke. Bump steer can be highly undesirable, especially within racing because braking, acceleration, roll, and transition over surfaces containing bumps all create movements that can magnify the effect of bump steer. A vehicle suspension constantly transitioning between bump and droop, will constantly be shifting the steering angle of the vehicle and can make steering unstable. Additionally, excessive bump steer can cause unnecessary heating and wear of the tires. Tires move over bumps very quickly and the associated in and out toe oscillations generated by too much bump steer produces un-wanted tire heat, tire wear and steering instability.

Conventional apparatus to measure bump steer may lack sufficient accuracy or precision for fine adjustment of bump steer to eliminate unwanted self-steering of the vehicle, tire heat or wear.

III. SUMMARY OF THE INVENTION

Accordingly, a broad object of the invention can be to provide a bump steer measurement apparatus including a framework adapted to support one or more of: a linear actuator positionable to engage and operable to move the vehicle suspension through suspension stroke, a first linear potentiometer positionable to contact a flat plate mounted to the vehicle hub of the vehicle along a flat plate first vertical margin during movement of the vehicle suspension through the suspension stroke; and a second linear potentiometer positionable to contact the flat plate mounted to the vehicle hub along a flat plate second vertical margin during movement of said vehicle suspension through said suspension stroke.

Another broad object of the invention can be provide a bump steer calculator including a processor communicatively coupled to a non-transitory computer readable medium containing a program code, including one or more of: a linear actuator driver operable to drive a linear actuator to move a vehicle suspension through a suspension stroke; a first linear potentiometer data recorder operable to record first linear potentiometer data generated by a first linear potentiometer in contact with a first vertical margin of a flat plate mounted to a vehicle hub during movement of the vehicle suspension through the suspension stroke, where the first linear potentiometer data varies based on movement of said plate first vertical margin around a hub vertical axis; a second linear potentiometer data recorder operable to record second linear potentiometer data generated by a second linear potentiometer in contact with said a second vertical margin of the flat plate mounted to vehicle hub during movement of the vehicle suspension through the suspension stroke, wherein the second linear potentiometer data varies based on movement of the plate second vertical margin around the hub vertical axis; a linear potentiometer data convertor operable to convert the first and second linear potentiometer data into first and second linear potentiometer data values; a linear potentiometer data comparator operable to compare said first linear potentiometer data to said second linear potentiometer data during movement of said vehicle suspension through said suspension stroke; and a bump steer calculator which determines a difference between the first linear potentiometer values and the second linear potentiometer data values to calculate a bump steer of the vehicle suspension.

Another broad object of the invention can be to display a graphical user interface on a display surface of a computing device which depicts one or more of: a front left suspension selection box and a front right suspension box which by user indication causes a first linear potentiometer data recorder and a second linear potentiometer data recorder to record first linear potentiometer data and second second linear potentiometer data in association with the suspension stroke of the front left suspension or front right suspension of the vehicle; a linear actuator position controller which by user indication causes movement of a linear actuator to move the selected front left vehicle suspension or the front right vehicle suspension in the suspension stroke of the front left suspension or the front right suspension of the vehicle; a linear actuator position readout which provides a visual indicia of a linear actuator absolute position in relation to a linear actuator zero position; a bump steer readout which provides a visual indicia of the difference between said first linear potentiometer values and the second linear potentiometer data values at the linear actuator absolute position in relation to the linear actuator zero position as a measurement of said bump steer in the front left suspension or in said right front suspension of the vehicle; and one or more data record boxes each of which by user indication depicts the visual indicia of the linear actuator absolute position and the visual indicia of said difference between said first linear potentiometer values and said second linear potentiometer data values as a measurement of the bump steer in the front left suspension or in said right front suspension of said vehicle at said absolute position of said linear actuator.

Naturally, further objects of the invention are disclosed throughout other areas of the specification, drawings, photographs, and claims.

V DETAILED DESCRIPTION OF THE INVENTION

Generally, with reference to FIGS. 1 through 12, which depict a vehicle suspension bump steer measurement apparatus (1) (also referred to as the "apparatus"), a method of making a vehicle suspension bump steer measurement apparatus (1) and method of measuring bump steer (BS) in a vehicle suspension for productive management of bump steer (BS) throughout compression (C) and rebound (R) of a vehicle suspension (2).

"Compression (C)" as used herein refers to the constriction of the vehicle suspension (2) for example, as the result of hitting a bump.

"Rebound (R)" as used herein refers to the expansion of the vehicle suspension (2), for example when 'rebounding' from hitting a bump.

"Suspension Stroke (SS)" as used herein refers to the distance traveled by the vehicle suspension (2) from the bottom of the suspension stroke (SS) when a hub (3) of the vehicle suspension (2) hangs freely to the top of the suspension stroke (SS) when the hub (3) can no longer move in the upward direction during compression (C) of the vehicle suspension.

"Camber (CBR)" as used herein refers to the onward or outward tilt of the wheels (5) as viewed from the front of the vehicle. The actual camber angle (θ) is the measure of the difference between the vertical alignment of the wheels (5) perpendicular to the surface as depicted by line (L6) and the line extending through the upper and lower ball joints (L5).

"Toe (T)" as used herein refers to the wheels pointing toward or away from the centerline of a vehicle (4).

"Bump Steer (BS)" as used herein refers to the change in toe (ΔT) during a suspension stroke (SS) and the corresponding tendency of a wheel (5) to steer inwards or outwards during compression (C) and rebound (R) of the wheel (5).

Figure 1:
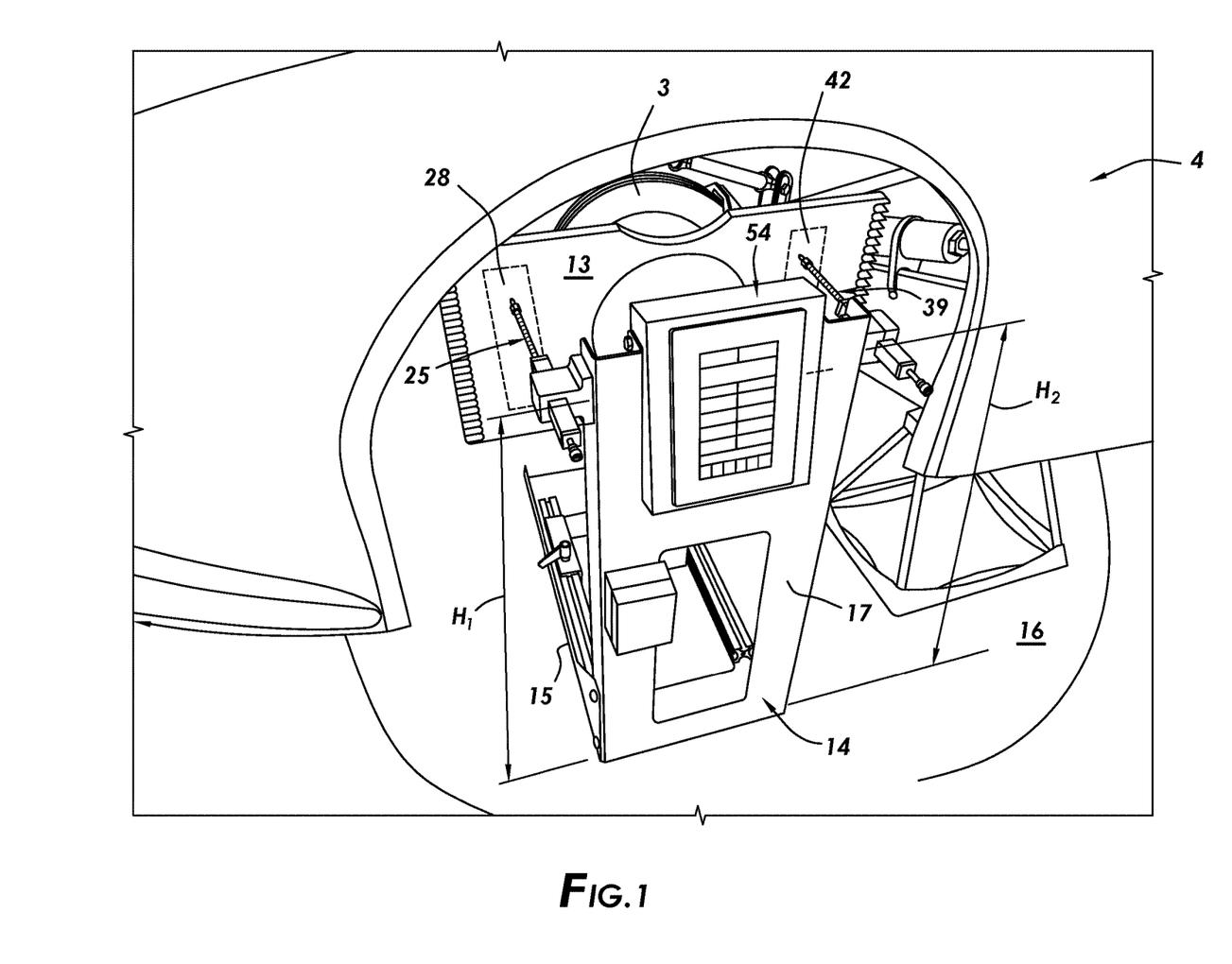
FIG. 1 is an illustration of an embodiment of the inventive bump steer measurement apparatus and method of using the inventive bump steer measurement apparatus to measure the bump steer in a vehicle suspension.
Figure 2:
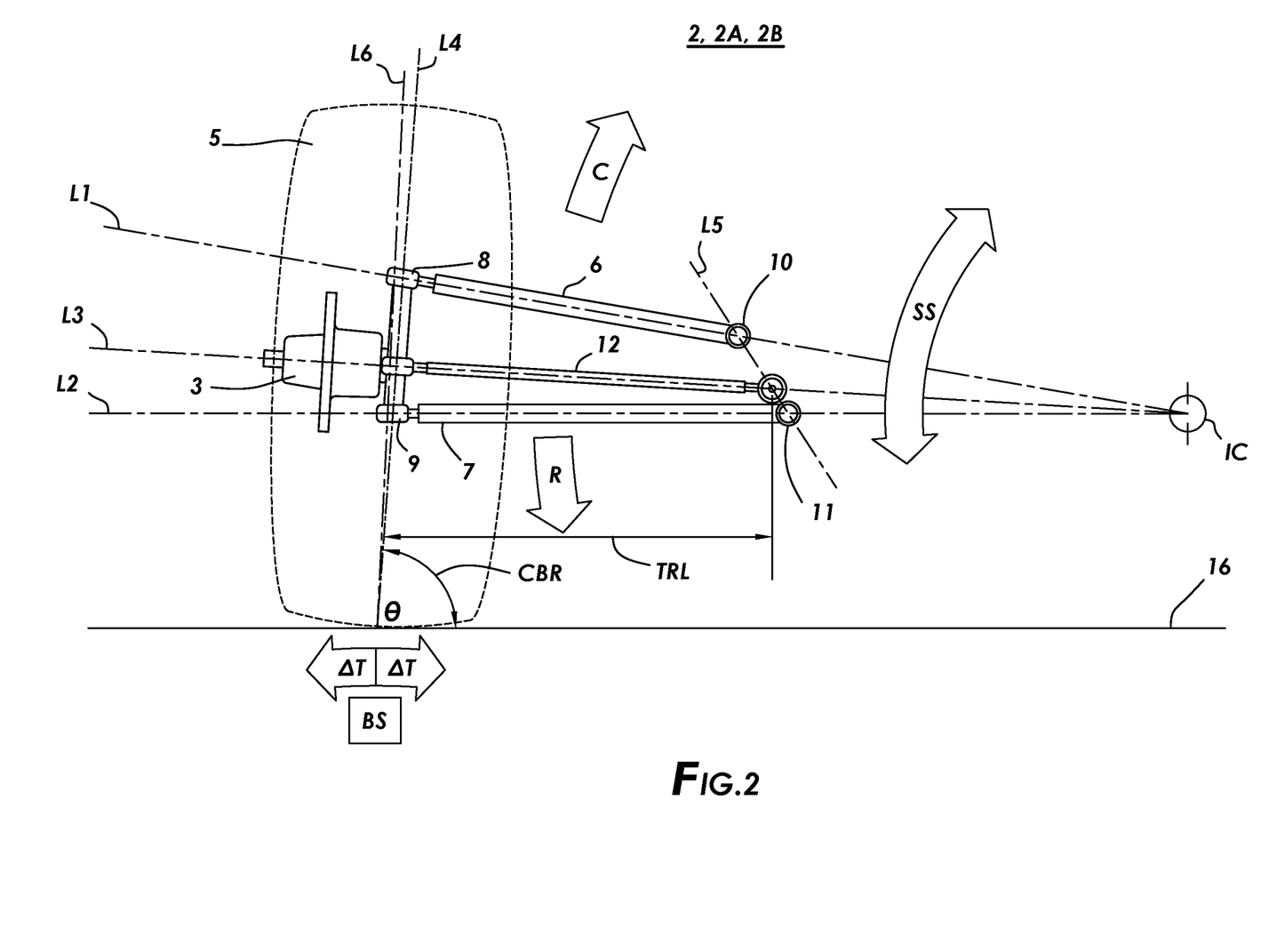
FIG. 2 is an illustration of the vehicle suspension geometry and suspension factors relating to change in toe during compression and rebound of a vehicle suspension.

Now, with primary reference to FIGS. 1 and 2, during compression (C) and rebound (R) of the vehicle suspension (2) the front wheel(s) (5) should have minimal or no bump steer (BS). As depicted in FIG. 2, to minimize or eliminate bump steer (BS) the angles of the upper control arm (6) and the lower control arm (7) of the vehicle suspension (2) must intersect at an instant center (IC). The instant center (IC) occurs at the intersection of the line lines (L1, L2) extending through the center of rotation of the ball joints (8, 9) and inner mounts (10, 11) of each the corresponding upper control arm (6) and the lower control arm (7). In order to minimize or eliminate bump steer (BS), in the first instance, the line (L3) extending through the tie rod (12) must pass through the instant center (IC). In the second instance, the tie rod length (TRL) must be equal to the distance formed by the lines extending through the centers of rotation of the tie-rod ends at the intersection of line (L3) with line (L4) extending through both the upper and lower ball joints (8, 9), and the line (L5) that passes through the inner chassis mounts (10, 11). The tie rod (12) not aligned with the instant center (IC) or the tie rod (12) having an incorrect tie rod length (TRL), causes bump steer (BS). As one illustrative example, if the line (L3) extending through the tie rod (12) passes below the instant center (IC), then the wheel (5) will bump-in toward the instant center (IC) as the suspension compresses (C), and bump-out as the suspension rebounds (R). If the line (L3) passes over the instant center (IC), then then wheel (5) will bump-out away from the instant center (IC) when the suspension compresses (C) and bump-in as the suspension rebounds (R). If the tie rod length (TRL) is too short, bump steer (BS) will occur in both the compression (C) and rebound (R) of the vehicle suspension (2). If the tie rod length (TRL) is too long, then bump-out will occur as the vehicle suspension (2) compresses (C) and rebounds (R).

Now, with primary reference to FIGS. 1 and 3 through 10, embodiments of a bump steer measurement apparatus (1) can include a flat plate (13) configured to mount to the hub (3) of a vehicle suspension (2). The flat plate (13) can include a plurality of holes located to receive the threaded studs extending from the hub (3). The flat plate (13) can be disposed against the hub (3) with the threaded studs extending through the plurality of holes in the flat plate (13). Lug nuts can be rotatingly tightened against the flat plate (13) to dispose the flat plate (13) in fixed spatial relation to the hub (3).

Again, with primary reference to FIGS. 1 and 3 through 10, embodiments can further include a framework (14) including a framework first portion (15) configured to engage a supporting surface (16) beneath the vehicle suspension (2) and a framework second portion (17) upwardly extending from the framework first portion (15). While the first and second framework portions (15, 17) can have generally rectangular configurations as depicted in the Figures, this is not intended to preclude other configurations of the framework first and second portions (15, 17) suitable for the operation of embodiments of the apparatus (1).

Again, with primary reference to FIGS. 1 and 3 through 10, embodiments can further include a linear actuator (18) coupled to the framework first portion (15) at a location which upon positioning the framework first portion (15) beneath the vehicle suspension (2) allows the linear actuator (18) to engage vehicle suspension (2) of the vehicle (4) and operated to move the vehicle suspension (2) through a suspension stroke (SS). The linear actuator (18) can operate to incrementally move the vehicle suspension (2) a user configurable distance(s) or preselected default distance(s) in the suspension stroke (SS). As one illustrative example, the linear actuator (18) can operate to incrementally move the vehicle suspension (SS), whether in compression (C) or rebound (R) of the vehicle suspension (2), in incremental movements of about one-inch (about 25.4 mm). Advantageously, the incremental movement of the linear actuator (18) can be accomplished with a high degree of accuracy. In particular embodiments, the accuracy over a portion of the suspension stroke (SS) of about two inches (about 50.8 mm) can be about 0.015 inch (about 0.381 mm). The ability to incrementally move the vehicle suspension (2) over small distances with great accuracy in compression (C) or rebound (R) in the suspension stroke (SS) allows obtention of a corresponding plurality of data points from which the bump steer (BS) of the vehicle suspension (2) can be measured and correlated with the position of vehicle suspension (2) in the suspension stroke (SS) to allow incremental correction in the vehicle suspension (2) geometry with a corresponding accuracy which cannot be accomplished by conventional bump steer devices or methods of measuring bump steer. One illustrative example of a linear actuator (18) that can be used in embodiments of the invention to achieve a suitable level of accuracy can be a Progressive Automations Model PA-04-6-400-HALL. In particular embodiments, the linear actuator (18) can be mounted in fixed spatial relation to the framework first portion (15) or can be mounted on a linear actuator carrier (19) movable on one or more rails (20, 21) allowing the linear actuator carrier (19) to be repositioned along the length of the one or more rails (20, 21). One more carrier securement devices (22, 23) can engage the one more rails (20, 21) and the linear actuator carrier (19) and operate to spatially fix the linear actuator carrier (19) in relation to the one or more rails (20, 21). The one or more carrier securement devices (22, 23) can as illustrative examples include: lever clamps, cam levers, bullet catches, or the like. The framework first portion (15) can further include one or more leveling feet (24), adjustable to raise or lower the framework first portion (15) in relation to the supporting surface (16).

Again, with primary reference to FIGS. 1 and 3 through 10, a first linear potentiometer (25) can be coupled to the framework second portion (17). The first linear potentiometer (25) can include a linear rod (26) slidably engaged to a linear potentiometer carrier (27). The linear rod (26) slides within the linear potentiometer carrier (27) to contact a wiper with a resistance track. The resistance of the resistor track varies based on the position of the wiper on the resistance track. The first linear potentiometer (25) proportionally divides an applied regulated voltage (Vi) over its operational range and provides a proportional voltage output (Vo) relevant to the position of the wiper. As an illustrative example, a first linear potentiometer (25) suitable for use in embodiments of the invention can be obtained from Harold G. Schaevitz Industries, Model No. LPPS-SL 100 mm. In particular embodiments, the first linear potentiometer (25) can be positionable on the framework second portion (17) to contact the flat plate (13) mounted to the hub (3) along a flat plate first vertical margin (28) during movement of the vehicle suspension (2) through the suspension stroke (SS). The first linear potentiometer (25) can measure displacement of the flat plate (13) around the steering axis (L4) of the hub (3) at the flat plate first vertical margin (28) during movement of the vehicle suspension (2) through the suspension stroke (SS). In particular embodiments, a first linear potentiometer mount (29) can be configured to move along framework second portion (17) and spatially fix the first linear potentiometer (25) at a height (H1) above the support surface (16). The first linear potentiometer mount (29) can be further configured to allow generally horizontal movement of the first linear potentiometer carrier (27) to spatially fix the liner rod (26) in contact with the flat plate first vertical margin (28). In particular embodiments, the framework second portion (17) can include a first vertical slot (30) along which the first linear potentiometer mount (29) can travel and be disposed in fixed spatial relation at a location along the first vertical slot (30) by operation of a first mount locking plate (31) forcibly urged against the framework second portion (17) by operation of a first cap screw (32) having a threaded shaft (33) extending from a cap (34). The threaded shaft (33) threadingly engages the first linear potentiometer mount (29) to draw the cap (34) against the first mount locking plate (31) with a tensile load sufficient to spatially fix the position of the first linear potentiometer mount (29) in relation to the frame second portion (17). The first linear potentiometer mount (29) can further define a pair of mateable mount halves (35, 36) which upon mated engagement define a first mount passthrough (37) for the first linear potentiometer carrier (27). The pair of mated mount halves (35, 36) can be drawn together by one or more mechanical fasteners (38) to contact the first linear potentiometer carrier (27) to spatially fix the position of the first linear potentiometer carrier (27) in the first mount passthrough (37).

Again, with primary reference to FIGS. 1 and 3 through 10, a second linear potentiometer (39) can be coupled to the framework second portion (17). The second linear potentiometer (39) can include a linear rod (40) slidably engaged to a linear potentiometer carrier (41). The linear rod slides within the linear potentiometer carrier (41) in contact a wiper with a resistance track. The resistance of the resistance track varies based on the position of the wiper on the resistance track. The second linear potentiometer (39) proportionally divides an applied regulated voltage (Vi) over its operational range and provides a proportional voltage output (Vo) relevant to the position of the wiper. As an illustrative example, the second linear potentiometer (39) suitable for use with embodiments of the invention can be obtained from Harold G. Schaevitz Industries, Model No. LPPS-SL 100 mm. The second linear potentiometer (39) can be positionable on the framework second portion (17) to contact the flat plate (13) mounted to the hub (3) along a flat plate second vertical margin (42) during movement of the vehicle suspension (2) through the suspension stroke (SS). The second linear potentiometer (39) can measure displacement of the flat plate (13) around the steering axis (L4) of the hub (3) at the flat plate second vertical margin (42) during movement of the vehicle suspension (2) through the suspension stroke (SS). In particular embodiments, a second linear potentiometer mount (43) can be configured to move along the framework second portion (17) and spatially fix the first second linear potentiometer at a height (H2) above the support surface (16). The second linear potentiometer mount (43) can be further configured to allow generally horizontal movement of the second linear potentiometer carrier (41) to spatially fix the liner rod (40) in contact with the flat plate second vertical margin (42). In particular embodiments, the framework second portion (17) can include a second vertical slot (45) along which the second linear potentiometer mount (43) can travel and be disposed in fixed spatial relation at a location along the second vertical slot (45) by operation of a second mount locking plate (46) forcibly urged against the framework second portion (17) by operation of a second cap screw (47) having a threaded shaft (48) extending from a cap (49). The threaded shaft (48) threadingly engages the second linear potentiometer mount (43) to draw the cap (49) against the second mount locking plate (46) with a tensile load sufficient to spatially fix the position of the second linear potentiometer mount (43) in relation to the frame second portion (17). The second linear potentiometer mount (43) can further define a pair of mateable mount halves (50, 51) which upon mated engagement define a second mount passthrough (52) for the second linear potentiometer carrier (41). The pair of mated mount halves (50, 51) can be drawn together by one more mechanical fasteners (53) to contact the second linear potentiometer carrier (41) to spatially fix the position of the second linear potentiometer carrier (41) in the second mount passthrough (52). Advantageously, the first linear potentiometer and the second liner potentiometer can have an accuracy of about 0.0001 inch (about 0.00254 mm) which allows obtention of calculated bump steer (BS) at a given incremental position of the vehicle suspension (2) in compression (C) or rebound (R) in the suspension stroke (SS) with a corresponding accuracy which cannot be achieved using conventional bump steer devices or methods.

Figure 12:
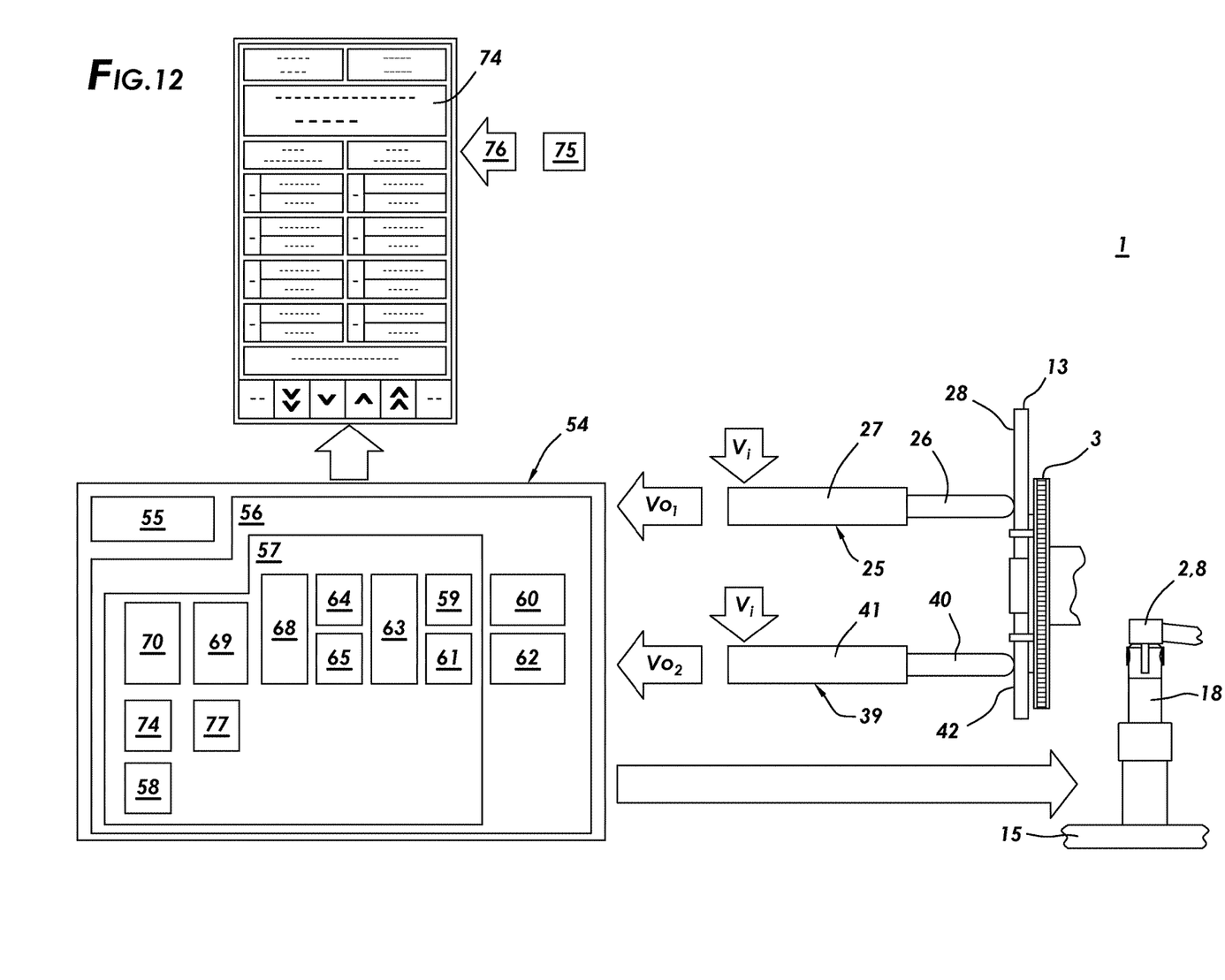
FIG. 12 is a block diagram of an embodiment of computing device including a processor communicatively coupled to a non-transitory computer readable memory containing a program code which by user indications in a graphical user interface controls the functions of the bump steer measurement device and calculates bump steer in a vehicle suspension.

Now, with primary reference to FIGS. 1 and 12, embodiments can further include a computing device (54). The computing device (54) can include a processor (55) communicatively coupled to a non-transitory computer readable medium (56) containing a program code (57). The program code (57) can include a linear actuator driver (58) executable to drive the linear actuator (18) to move the vehicle suspension through the entire compression (C) or rebound (R) of suspension stroke (SS) or increment movement through all or a portion of the compression (C) or rebound (R) of the suspension stroke (SS), for example, in about one inch (about 25.4 mm) increments of movement.

Again, with primary reference to FIGS. 1 and 12, the program code (57) can include a first linear potentiometer data recorder (59) operable to record first linear potentiometer data (60) generated by the first linear potentiometer (25). The first linear potentiometer (25) in contact with the first vertical margin (28) of the flat plate (13) mounted to the hub (3) of the vehicle suspension (2) during movement of the vehicle suspension (2) through the suspension stroke (SS) can generate first linear potentiometer data (60) which varies based on movement of the flat plate first vertical margin (28) around the hub vertical axis (L4). In particular embodiments, the first linear potentiometer (25) proportionally divides an applied regulated voltage (Vi) over its operational range and provides a proportional voltage output (Vo) relevant to the movement of the flat plate vertical margin (28).

Again, with primary reference to FIGS. 1 and 12, the program code (57) can further include a second linear potentiometer data recorder (61) operable to record second linear potentiometer data (62) generated by the second linear potentiometer (39). The second linear potentiometer (39) in contact with the second vertical margin (42) of the flat plate (13) mounted to the hub (3) of the vehicle suspension (2) during movement of the vehicle suspension (2) through the suspension stroke (SS) can generate second linear potentiometer data (62) which varies based on movement of the flat plate second vertical margin (42) around the hub vertical axis (L4). In particular embodiments, the second linear potentiometer (39) proportionally divides the applied regulated voltage (Vi) over its operational range and provides a proportional voltage output (Vo) relevant to the movement of the flat plate second vertical margin (42).

Again, with primary reference to FIGS. 1 and 12, the program code (57) can further include a linear potentiometer data convertor (63) operable to convert the first linear potentiometer data (60) and the second linear potentiometer data (62) into first linear potentiometer values (64) and second linear potentiometer data values (65). In particular embodiments, the first linear potentiometer data (60) can be generated as a first analog voltage output ($Vo_1$) and the second linear potentiometer data (62) can be generated as a second analog voltage output ($Vo_2$) can be correspondingly converted to a first linear potentiometer digital value (66) and a second linear potentiometer digital value (67) by an analog-to-digital converter (68).

Again, with primary reference to FIGS. 1 and 12, the program code (57) can further include a linear potentiometer data comparator (69) operable to compare the first linear potentiometer data (60) to the second linear potentiometer data (62) during movement of the vehicle suspension through the suspension stroke (SS). In particular embodiments, the linear potentiometer data comparator (69) compares the first linear potentiometer digital value (66) and a second linear potentiometer value (67). Movement of the vehicle suspension (2) through the suspension stroke (SS) can move the flat plate (13) inboard or outboard due to change in camber (CBR) unrelated to toe (T). In the event that the difference between the first linear potentiometer value (64) and the second linear potentiometer value (65) at a particular position is zero, then there is no change in toe (T). In the event that the one of the first linear potentiometer value (64) or the second linear potentiometer value (65) increases will the other one of the first linear potentiometer value (64) or the second linear potentiometer value (65) decreases then the difference of the first linear potentiometer value (64) and the second linear potentiometer value (65) is the change in toe (T).

Again, with primary reference to FIGS. 1 and 12, the program code (57) can further include a bump steer calculator (70) which calculates a bump steer numerical value (71) for the change in toe (T) in the vehicle suspension (2) during movement from a linear actuator zero position (71) to a linear actuator absolute position (72) which represents the bump steer (BS) at that a linear actuator absolute position (72).

Figure 3:
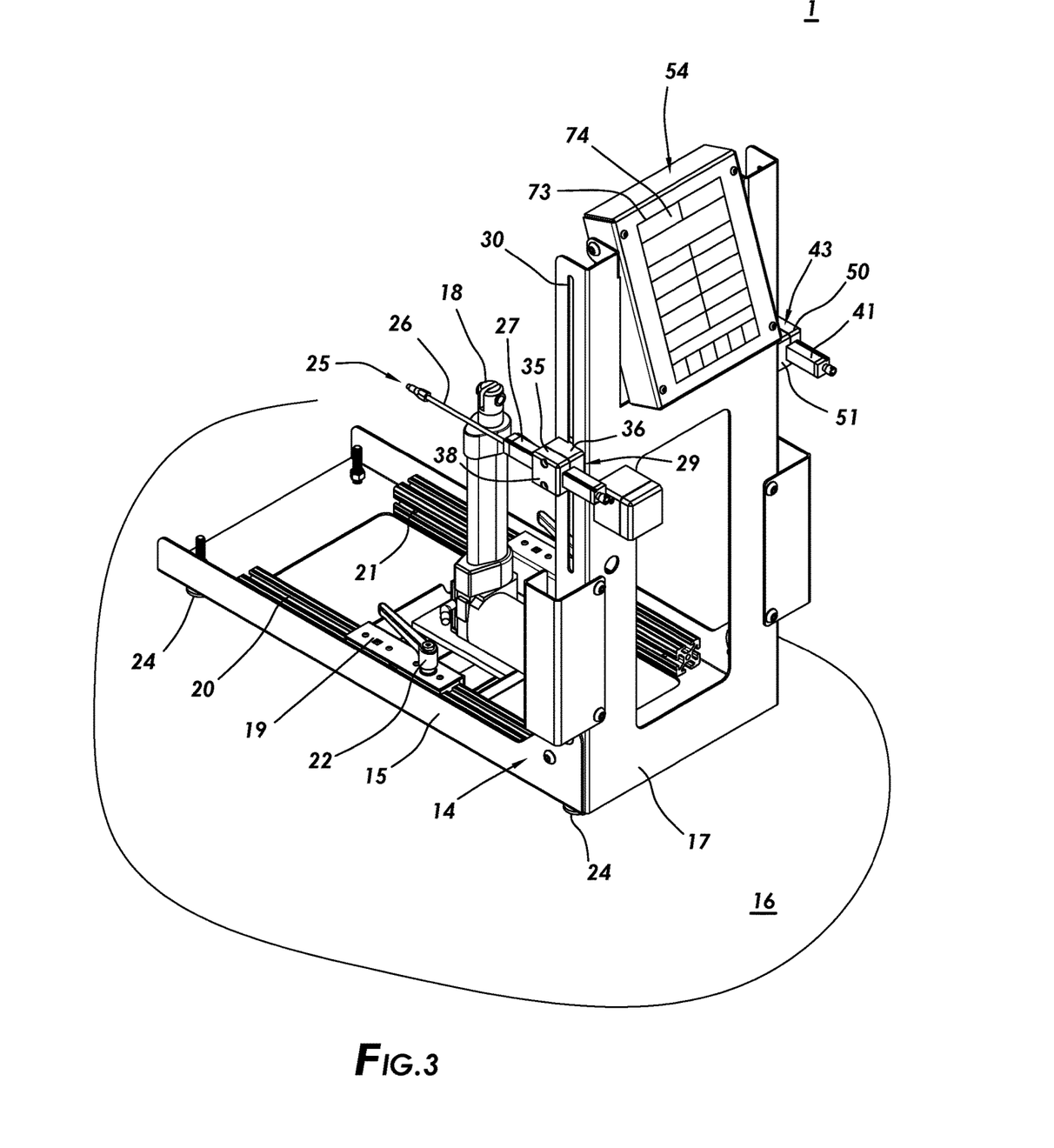
FIG. 3 is a front elevation perspective view of an embodiment of the bump steer measurement apparatus.
Figure 4:
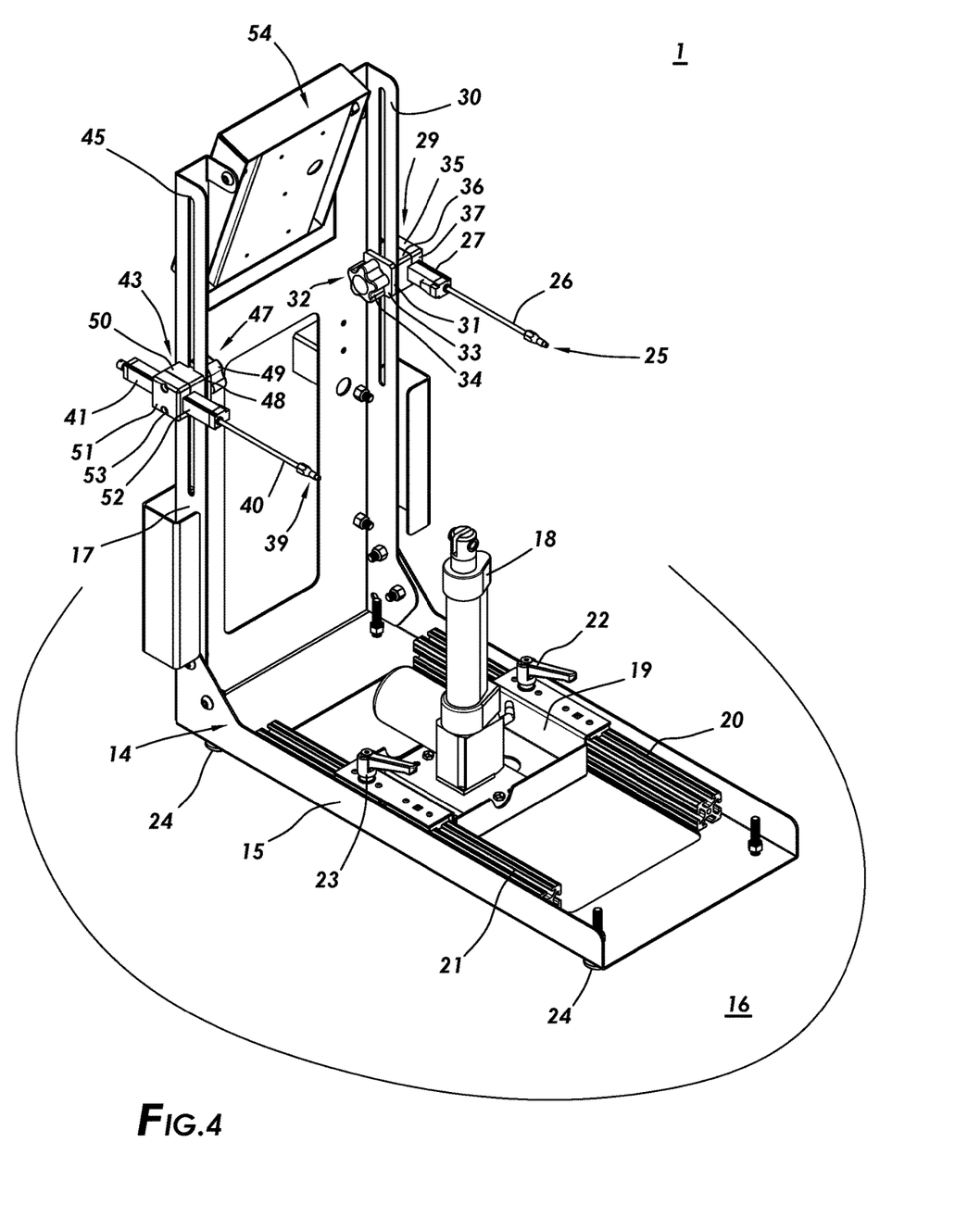
FIG. 4 is a rear elevation perspective view of an embodiment of the bump steer measurement apparatus.
Figure 5:
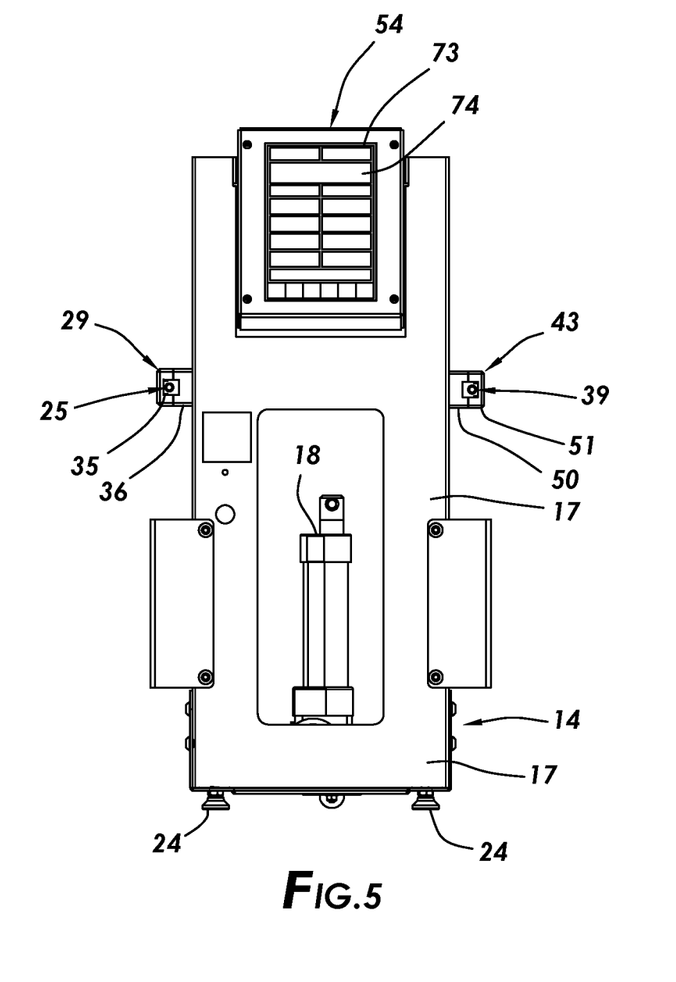
FIG. 5 is front elevation view of an embodiment of the bump steer measurement apparatus.
Figure 6:
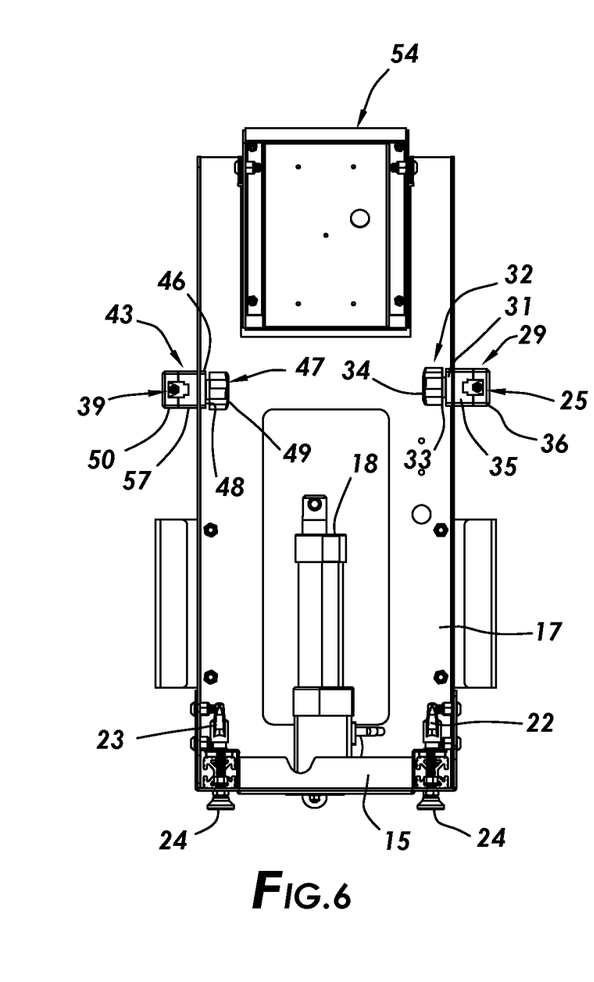
FIG. 6 is a rear elevation view of an embodiment of the bump steer measurement apparatus.
Figure 7:
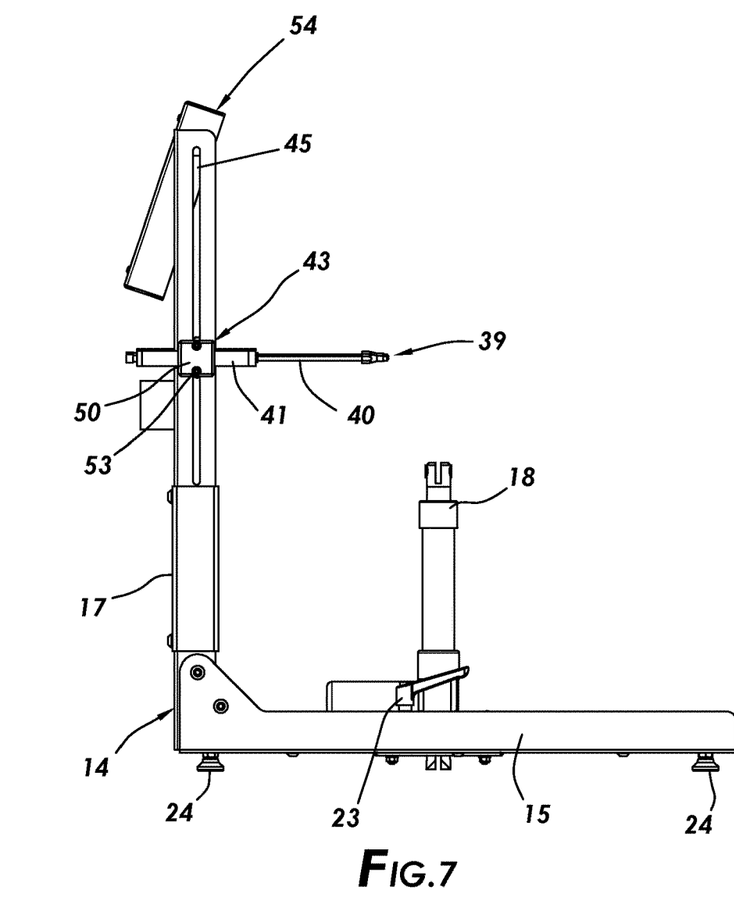
FIG. 7 is first side elevation view of an embodiment of the bump steer measurement apparatus.
Figure 8:
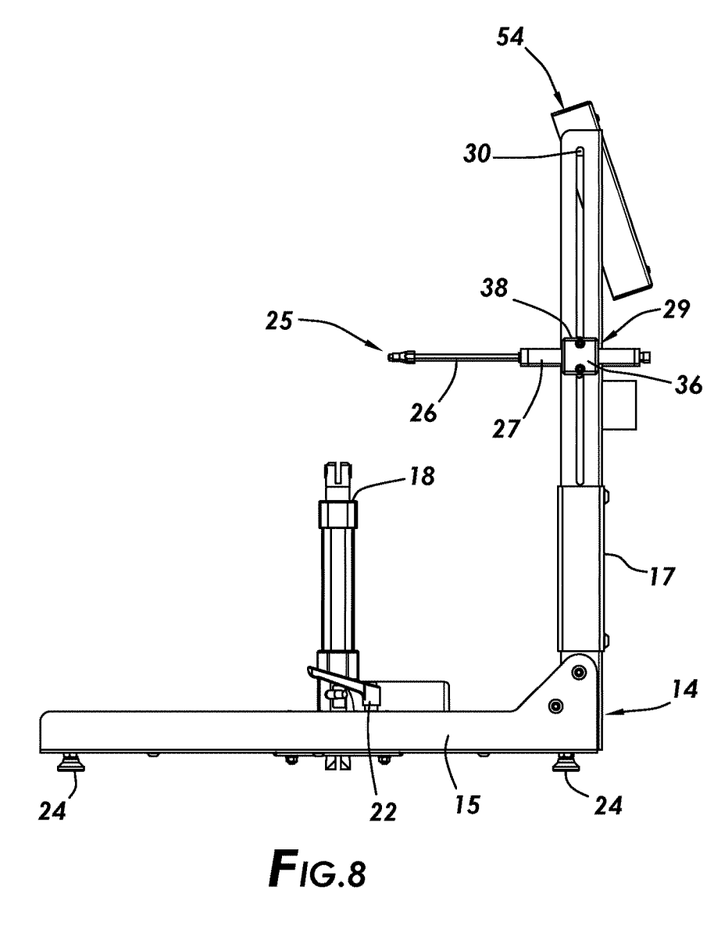
FIG. 8 is second side elevation view of an embodiment of the bump steer measurement apparatus.
Figure 9:
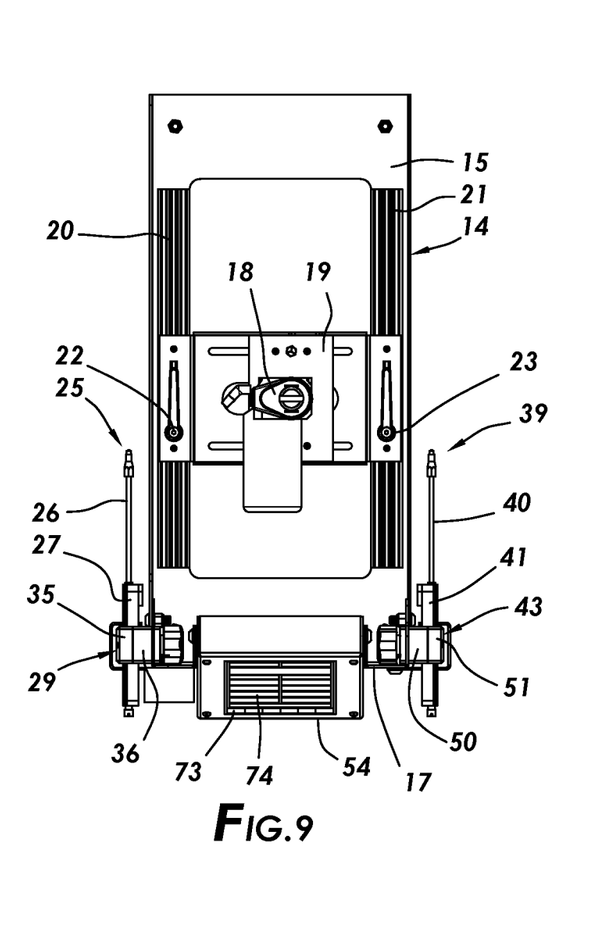
FIG. 9 is a top plan view of an embodiment of the bump steer measurement apparatus.
Figure 10:
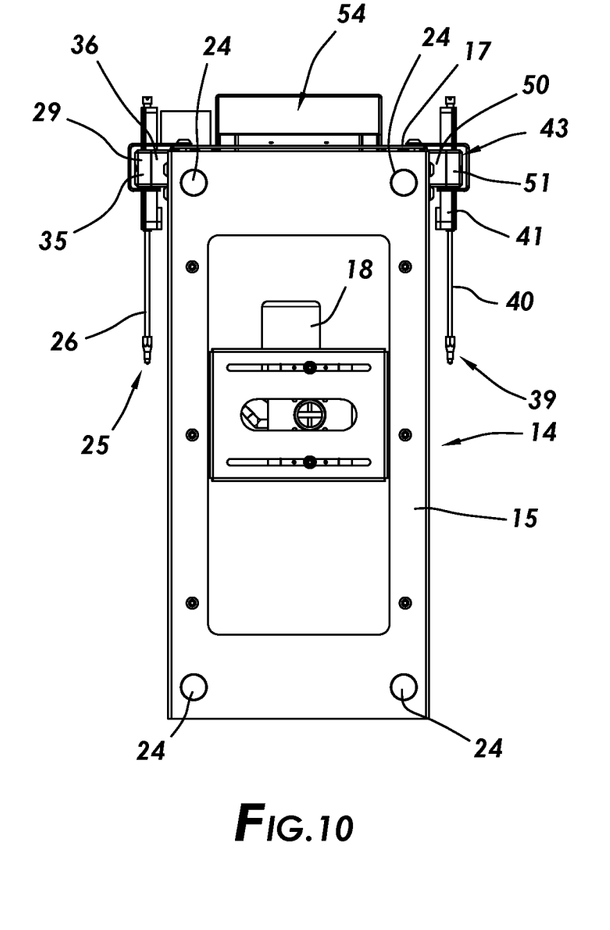
FIG. 10 is a bottom plan view of an embodiment of the bump steer measurement apparatus.

Now, with primary reference to FIGS. 1 and 3, the computing device (54) can further include a display surface (73). In particular embodiments, the computing device (54) can, but need not necessarily, be mounted to the framework second portion (17) or can, but need not necessarily, be removably mounted to the framework second portion (17). Alternatively, the computing devices (54), can be one or more computing devices (54) separate from the framework (14). Illustrative examples of a computing device (54) that can be used separate from the framework (14) can be: smart phones, slate or pad computers, personal digital assistants or camera/cell phones, or multiprocessor systems, microprocessor-based or programmable consumer electronics, network PCs, minicomputers, or the like.

Figure 11:
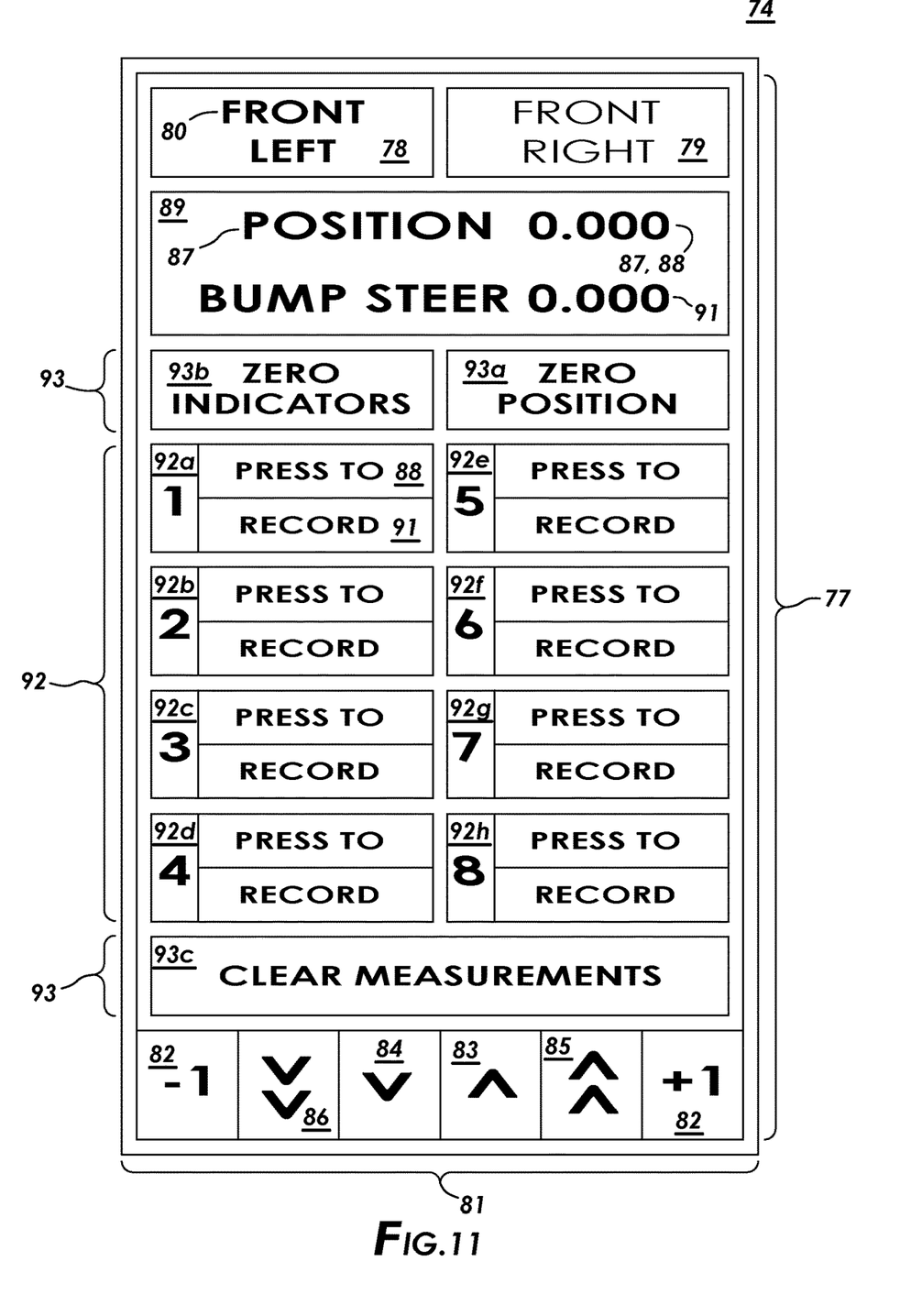
FIG. 11 is an illustration of an embodiment of a graphical user interface depicted on the display surface of a computing device.

Now, with primary reference to FIG. 11, the program code (57) can further operate to depict and implement a graphical user interface (74) on the display surface (73) of the computing device (54) which correspondingly allows a user (75) by user indications (76) in the graphical user interface (74) to execute one or more functions of the program code (57). FIG. 11 depicts a particular embodiment of the graphical user interface (74) in which graphical user interface content items (77) have particular spatial arrangement and configuration. One can appreciate that in alternative embodiments the content items (77) depicted in the graphical user interface (74) can each have the same or different size, shape, or orientation while still actuating the same or similar function of the program code (54) upon applied user indications (76). The user indications (76), as illustrative examples, can include depending on the embodiment: touch or hover over selection box(es) or control icon(s), entry of text into one or more fillable fields, voice command, keyboard stroke, mouse button point and click, touch on a touch screen, or otherwise, or combinations thereof (individually or collectively referred to as a "user indications").

Now, with primary reference to FIG. 11, in particular embodiments, the graphical user interface (74) can depict a front left suspension selection box (78) (as shown in the example of FIG. 11 as "Front Left") which by user indications (76) causes the first linear potentiometer data recorder (59) and second linear potentiometer data recorder (61) to record the first linear potentiometer data (60) and the second linear potentiometer data (62) in association with the a front left suspension (2A) of the vehicle (4). Similarly, the graphical user interface (74) can depict a front right suspension selection box (79) (as shown in the example of FIG. 11 as "Front Right") which by user indications (76) actuates the first linear potentiometer data recorder (59) and the second linear potentiometer data recorder (61) to record the first linear potentiometer data (60) and the second linear potentiometer data (62) in association with the front right suspension (2B) of the vehicle (4). Selection of the front left or front right suspension box (78, 79) can cause the selected one of the front left or front right suspension box (78, 79) to present a visual indicia (80) of the selection (as shown in the example of FIG. 11 "Front Left" was selected and provides the visual indicia (80) of being depicted in bold type although other visual indica (80) can be utilized such as highlighting the box or changing the type color or type font or style).

Again, with primary reference to FIG. 11, the graphical user interface (74) can depict a linear actuator position controller (81) which by user indications (76) causes movement of the linear actuator (18) to move the front left vehicle suspension (2A) or the front right vehicle suspension (2B) in the corresponding suspension stroke (SS). In the particular embodiments the linear actuator position controller (81) can include a depiction of linear actuator movement numerical values (82) (as shown in the example of FIG. 11 "−1" or "+1" which by user indications (76) causes movement of the linear actuator (18) upward one inch or downward one inch). In particular embodiments, the linear actuator position controller (81) can include a linear actuator up movement icon (83) and a linear actuator down movement icon (84) which by respective user indications (76) causes the upward movement or downward movement of the linear actuator (18) (as shown in the example of FIG. 11 a single upward carrot ˆ or a single downward carrot ˅) as long as user indications (76) are associated with the respective linear actuator up movement icon (83) or a linear actuator down movement icon (84). In particular embodiments, the linear actuator position controller (81) can include a linear actuator fast up movement icon (85) and a linear actuator fast down movement icon (86) (as shown in the example of FIG. 11 as a double upward carrot or a double downward carrot). The term "fast" as between two linear actuator movement icons means the linear movement icon which effects movement of the linear actuator (18) at greater speed.

Again, with primary reference to FIG. 11, the graphical user interface (74) can depict a linear actuator position readout (87) which provides visual indicia (87) of the linear actuator absolute position (72) in relation to a linear actuator zero position (71) (as shown the illustrative example of FIG. 11 "Position" followed by a position numerical value "0.000" that changes based on the absolute position (72) of the linear actuator (18)). For example, if by user indications (76) in the linear actuator position controller (81) the linear actuator absolute position (72) occurs at one inch (25.4 mm), then the position numerical value (88) will read out as +1.000 inch. If by user indications (76) in the linear actuator position controller (81) the linear actuator absolute position (72) occurs at two inches (50.8 mm), then the position numerical value (88) will read out as +2.000 inches, and so forth.

Again, with primary reference to FIG. 11, the graphical user interface (74) can depict a bump steer readout (89) which provides a visual indicia (90) of the difference between the first linear potentiometer data value (64) and the second linear potentiometer data value (65) at the selected linear actuator absolute position (72) as a measurement of the bump steer (BS) (in the illustrative example of FIG. 11 "Bump Steer" followed a bump steer numerical value (91)).

For example, user indications (76) in a front left suspension selection box (78) selects the front left suspension (2A). User indications (76) in the linear actuator position controller (81) selects a linear actuator absolute position (72) with corresponding movement of the linear actuator (18) and readout of the position numerical value (88) of the linear actuator absolute position (72) (for example 1.000 inch). The program code (57) then functions to read out the bump steer numerical value (91) of the bump steer (BS) associated with the position numerical value (88) of the linear actuator absolute position (72) (for example BS −0.00589 inch (0.1496 mm).

Again, with primary reference to FIG. 11, in particular embodiments, the graphical user interface (74) can depict one or more data record boxes (92) (in the example of FIG. 11 eight data record boxes "Press To Record"). By user indications (76) in a first of the data record boxes (92a), the program code (57) can function to record the linear actuator absolute position (72) and the associated bump steer (BS). In particular embodiments, the program code (57) can function to readout the position numerical value (88) for the selected linear actuator absolute position (72) and the associated bump steer numerical value (91) in the first of selected data record boxes (92a). For example, user indications (76) in the linear actuator position controller (81) selects a linear actuator absolute position (72) with corresponding movement of the linear actuator (18) and a readout of the position numerical value (88) of the linear actuator absolute position (72) (for example 1.000 inch). The program code (57) can then function to read out the bump steer numerical value (91) of the bump steer (BS) associated with the position numerical value (88) of the linear actuator absolute position (72), for example −0.0058 inch (1496 mm). By user indications (76) in a first of the data record boxes (76a) the program code (57) can function to record the linear actuator absolute position (72) of $_+1.000$ inch and the associated bump steer (BS) of −0.00589 inch associated with front left suspension (2A) to the non-transitory computer readable medium (56) and depict the position numerical value +1.000 in the first of the selected data record boxes (92a) and depict the bump steer numerical value (91) in the first of the selected data record boxes (92a). In the illustrative example of FIG. 11, the method can be repeated whereby user indications (76) can serially select up to eight linear actuator absolute positions (72) for the left front suspension (2A) and the bump steer calculator (70) can correspondingly calculate the bump steer (BS) attributable in the left front suspension (2A) at each of the eight linear actuator absolute positions (72). The program code (57) can correspondingly function to serially read out the eight linear actuator absolute position numerical values (72) and the corresponding bump steer numerical values (91) in the respective data record boxes (92a, 92b, 92c, 92d, 92e . . . 92h).

Again, with primary reference to FIG. 11, in particular embodiments, the graphical user interface (74) can depict one or more clear visual indicia box (93) which by user indications (76) causes the visual indicia (80) of the linear actuator absolute position (72) and a visual indicia (90) of the bump steer (BS) to be cleared from the graphical user interface (74). As shown by the illustrative example of FIG. 11, the position numerical value (88) can be cleared by user indications (76) in a clear linear actuator absolute numerical value box (93a) (shown as "Zero Position" box) and the bump steer numerical value (91) can be cleared by user indications (76) in a clear bump steer numerical value box (92b) (shown as "Zero Indicators" box). In particular embodiments, all position numerical values (88) and all the bump steer numerical values (91) can be cleared by user indications in a clear all numerical values box (93*c*) (shown as "Clear Measurements" box).

As can be easily understood from the foregoing, the basic concepts of the present invention may be embodied in a variety of ways. The invention involves numerous and varied embodiments of a bump steer calculator and methods for making and using a bump steer calculator including the best mode of the invention.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "calculator" should be understood to encompass disclosure of the act of "calculating"—whether explicitly discussed or not—and, conversely, were there is a disclosure of the act of "calculating", such a disclosure should be understood to encompass disclosure of a "calculator" and even a "means for calculating". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the bump steer calculators herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An apparatus, comprising:
   a flat plate mounted to a hub of a vehicle suspension; a linear actuator positionable to engage said vehicle suspension,
   said linear actuator operable to move said vehicle suspension in successive incremented distances through a suspension stroke to obtain corresponding data points at each of said incremented distances, wherein said linear actuator has an accuracy over a suspension stroke of about two inches (about 50.8 mm) of about 0.015 inch (about 0.381 mm);
   a first linear potentiometer positionable to contact said flat plate mounted to said hub along a flat plate first vertical margin during movement of said vehicle suspension through said suspension stroke; and
   a second linear potentiometer positionable to contact said flat plate mounted to said vehicle hub along a flat plate second vertical margin during movement of said vehicle suspension through said suspension stroke.

2. The apparatus of claim 1, wherein said incremented distances comprise preselected default distances or user configured distances in said suspension stroke.

3. The apparatus of claim 1, wherein said first linear potentiometer and said second liner potentiometer have an accuracy of about 0.0001 inch (about 0.00254 mm).

4. An apparatus, comprising:
   a processor communicatively coupled to a non-transitory computer readable medium containing a program code, including:
   a linear actuator driver operable to drive a linear actuator to move a vehicle suspension through a suspension stroke;
   a first linear potentiometer data recorder operable to record first linear potentiometer data generated by a first linear potentiometer in contact with a first vertical margin of a flat plate mounted to a hub of said vehicle during movement of said vehicle suspension through said suspension stroke, said first linear potentiometer data varies based on movement of said plate first vertical margin around a hub vertical axis;
   a second linear potentiometer data recorder operable to record second linear potentiometer data generated by a second linear potentiometer in contact with a second vertical margin of said flat plate mounted to said hub of said vehicle during movement of said vehicle suspension through said suspension stroke, said second linear potentiometer data varies based on movement of said plate second vertical margin around said hub vertical axis; and
   a linear potentiometer data comparator operable to compare said first linear potentiometer data to said second linear potentiometer data during movement of said vehicle suspension through said suspension stroke.

5. The apparatus of claim 4, further comprising:
   a linear potentiometer data convertor operable to convert said first and second linear potentiometer data into first and second linear potentiometer data values; and
   a bump steer calculator which determines a difference between said first linear potentiometer values and said second linear potentiometer data values to calculate a bump steer of said vehicle suspension.

6. The apparatus of claim 4, wherein said linear actuator operable to move said vehicle suspension in successive incremented distances through a suspension stroke, and wherein said first and second linear potentiometer data recorders operable to record said first and second linear potentiometer data at each of said incremented distances.

7. The apparatus of claim 6, wherein said computer code further operable to depict a graphical user interface on a display surface, wherein said incremented distances input by user indications in said graphical user interface.

8. The apparatus of claim 4, wherein said computer code further operable to depict a graphical user interface on said a display surface, wherein said graphical user interface depicts a front left suspension selection box which by user indication causes said first linear potentiometer data recorder and second linear potentiometer data recorder to record said first linear potentiometer data and said second linear potentiometer data in association with said suspension stroke of a front left suspension of said vehicle.

9. The apparatus of claim 8, wherein said graphical user interface depicts a front right suspension selection box which by user indication actuates said first linear potentiometer data recorder and said second linear potentiometer data recorder to record said first linear potentiometer data and said second linear potentiometer data in association with said suspension stroke of a front right suspension of said vehicle.

10. The apparatus of claim 9, wherein said graphical user interface depicts a linear actuator position controller which by user indication causes movement of said linear actuator to move said front left vehicle suspension or said front right vehicle suspension in said suspension stroke of said front left suspension or said front right suspension of said vehicle.

11. The apparatus of claim 10, wherein said graphical user interface depicts a linear actuator position readout which provides a visual indicia of a linear actuator absolute position in relation to a linear actuator zero position.

12. The apparatus of claim 11, wherein said graphical user interface depicts a bump steer readout which provides a visual indicia of said difference between said first linear potentiometer values and said second linear potentiometer data values at said linear actuator absolute position in relation to said linear actuator zero position as a measurement of said bump steer in said front left suspension or in said right front suspension of said vehicle.

13. The apparatus of claim 12, wherein said graphical user interface depicts one or more data record boxes each of which by user indication depicts said visual indicia of said linear actuator absolute position and said visual indicia of said difference between said first linear potentiometer values and said second linear potentiometer data values as a measurement of said bump steer in said front left suspension or in said right front suspension of said vehicle at said absolute position of said linear actuator.

14. The apparatus of claim 13, wherein said graphical user interface depicts a clear visual indicia box which by user indications causes said visual indicia of said linear actuator absolute position and a visual indicia of said difference between said first linear potentiometer values and said second linear potentiometer data values to be cleared from said graphical user interface.

* * * * *